(12) United States Patent
Blaser et al.

(10) Patent No.: US 11,298,803 B2
(45) Date of Patent: Apr. 12, 2022

(54) SUPPORTING MACHINING WORKPIECES

(71) Applicant: TRUMPF Laser- und Systemtechnik GmbH, Ditzingen (DE)

(72) Inventors: Martin Blaser, Vogt (DE); Gunter Fischer, Moensheim (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 80 days.

(21) Appl. No.: 16/901,120

(22) Filed: Jun. 15, 2020

(65) Prior Publication Data
US 2020/0306936 A1 Oct. 1, 2020

Related U.S. Application Data

(63) Continuation of application No. PCT/EP2018/084806, filed on Dec. 13, 2018.

(30) Foreign Application Priority Data

Dec. 15, 2017 (DE) .......................... 102017222860.1

(51) Int. Cl.
*B25B 11/00* (2006.01)
(52) U.S. Cl.
CPC ................. *B25B 11/005* (2013.01)
(58) Field of Classification Search
CPC ....... B25B 11/00; B25B 11/005; B25B 11/02; B23K 26/16; B23K 37/0408; B23K 37/0461
USPC ................. 269/20, 21, 289 r, 302.1
See application file for complete search history.

(56) References Cited

FOREIGN PATENT DOCUMENTS

| CN | 101066620 A | 11/2007 |
|---|---|---|
| CN | 101619866 A | 1/2010 |
| CN | 102383579 A | 3/2012 |
| CN | 106077011 A | 11/2016 |
| CN | 206425483 U | 8/2017 |
| DE | 29517690 U1 | 3/1996 |
| DE | 19920058 A1 | 11/2000 |
| DE | 202009006786 U1 | 9/2009 |
| DE | 202013010402 U1 | 1/2014 |

(Continued)

OTHER PUBLICATIONS

JP-2002273594-A Machine Translation (Year: 2002).*

(Continued)

*Primary Examiner* — Lee D Wilson
*Assistant Examiner* — Alberto Saenz
(74) *Attorney, Agent, or Firm* — Fish & Richardson P.C.

(57) ABSTRACT

A workpiece support includes a workpiece support element and a suction device. A workpiece is mounted on a workpiece side of the workpiece support element during machining. Towards a remote lower side, the workpiece support element is permeable to a waste air flow loaded with machining-related emissions. The suction device includes a vacuum generator and a suction line. The vacuum generator is configured to generate the waste air flow flowing from the workpiece side to the lower side, to suck off the waste air flow into the suction line in a flow direction and to subsequently discharge the waste air flow via the suction line. The suction line has a suction opening having a flow cross section which can be passed by the waste air flow in the flow direction. An opening width of the flow cross section and/or a position of the suction opening can be variably adjusted.

29 Claims, 5 Drawing Sheets

(56) References Cited

FOREIGN PATENT DOCUMENTS

| DE | 102013226816 A1 | | 6/2015 |
|---|---|---|---|
| JP | 2002-273594 A | | 9/2002 |
| JP | 2002273594 A | * | 9/2002 |
| WO | WO 2019/115715 A2 | | 6/2019 |
| WO | WO 2019/115715 A3 | | 8/2019 |

OTHER PUBLICATIONS

DE Office Action in German Appln. No. 10 2017 222 860, dated Oct. 11, 2018, 21 pages (with English translation).
PCT International Search Report and Written Opinion in International Appln. No. PCT/EP2018/084806, dated Jul. 4, 2019, 17 pages (with English translation).
PCT International Preliminary Report on Patetntability in International Appln. No. PCT/EP2018/084806, dated Jun. 16, 2020, 15 pages (with English translation).
CN Office Action in Chinese Appln. No. 201880080900.8, dated Jun. 2, 2021, 19 pages (with English translation).

* cited by examiner

SUPPORTING MACHINING WORKPIECES

CROSS REFERENCE TO RELATED APPLICATIONS

This application is a continuation of and claims priority under 35 U.S.C. § 120 from PCT Application No. PCT/EP2018/084806, filed on Dec. 13, 2018, which claims priority from German Application No. 10 2017 222 860.1, filed on Dec. 15, 2017. The entire contents of each of these priority applications are incorporated herein by reference.

TECHNICAL FIELD

The present disclosure relates to workpiece supports and machine tools for supporting machining workpieces.

BACKGROUND

Generic prior art is known from JP S2002273594 A, which discloses a workpiece support having a support grid that supports workpieces on its upper side during thermal machining. Because of the thermal machining of a workpiece, machining-related emissions occur on the upper side of the support grid. In particular, gases and fine solid particles are emitted from the machining site on the relevant workpiece. Three compartments of the workpiece support which are open towards the support grid and are separated from one another by partitions are formed in a box-like substructure of the support grid. In each of the compartments below the support grid three suction lines of a suction device extend in parallel with one another and in parallel with the support grid.

The wall of the suction lines is provided with suction openings. On both longitudinal ends the three suction lines of a compartment of the workpiece support in each case abut a collecting line extending in a transverse direction of the suction lines. A wall element of each collecting line situated towards the suction lines is displaceable in a transverse direction of the suction lines and is provided with three wall openings which follow one another in the displacement direction and of which the contour in each case corresponds to the free cross section of one of the three suction lines. The displaceable wall elements of the collecting lines can be moved selectively into an open position, in which each of the wall openings of the wall elements is aligned with the interior of one of the suction lines, or into a closed position, in which the suction lines are closed at one of their ends in each case by a closed region of the displaceable wall elements.

If in the open position of the displaceable wall elements of the collecting lines a vacuum generated by a vacuum pump of the suction device is applied to the collecting lines, waste air which is loaded with machining-related emissions is sucked off under the effect of the vacuum from the upper side of the support grid to the suction lines and through the suction openings of the suction lines into the interior thereof. From there, the waste air passes through the wall openings of the displaceable wall elements aligned with the interior of the suction lines and into the collecting lines. Finally, by the collecting lines the waste air is discharged from the proximal region of the workpiece support. Only the displaceable wall element of the suction line on the compartment of the workpiece support, above which machining of a workpiece takes place, is moved into the open position under computer control. The displaceable wall elements on the remaining compartments of the workpiece support are in the closed position and consequently separate the suction lines in the interior of the relevant compartments of the workpiece support from the vacuum pump of the suction device connected to the collecting lines.

SUMMARY

Implementations of the present disclosure provide workpiece supports and machine tools for supporting machining workpieces, which can improve the adaption of the suction of machining-related emissions to the actual machining conditions.

One aspect of the present disclosure features a workpiece support of a machine tool for machining workpieces. The workpiece support includes: a workpiece support device having a workpiece side for supporting a workpiece during machining of the workpiece and a lower side remote from the workpiece side, and a suction device including a vacuum generator and a suction line. From the workpiece side towards the lower side, the workpiece support device is permeable to a waste air flow loaded with machining-related emissions. The vacuum generator is configured to: generate the waste air flow directed from the workpiece side towards the lower side of the workpiece support device, suck off (or vacuum away) the waste air flow into the suction line in a flow direction, and subsequently discharge the waste air flow via the suction line. The suction line has a suction opening on a support device side arranged downstream of the workpiece side of the workpiece support device, and a flow cross section of the suction opening has an opening width. The suction line is configured such that the waste air flow in the flow direction is capable of passing through the flow cross section of the suction opening of the suction line.

In the present disclosure, the opening width of the flow cross section of a suction opening, through which waste air loaded with machining-related emissions is sucked off from the upper side of a workpiece support element into a suction line, can be variably adjusted. Accordingly, the possibility exists of opening the suction opening more or less wide as required, and thereby the suction power available on the suction line and to be provided by the vacuum generator of the suction device according to the present disclosure can be adapted to the specific application of the process or the machine tool. In addition or alternatively, it is provided according to the present disclosure that the position of the suction opening is variable. The location at which the suction power is provided on the workpiece support changes due to a change of position of the suction opening. The suction line is preferably arranged on the lower side of the workpiece support element, specifically in a delimited suction region of the workpiece support.

In some embodiments, the opening width of the flow cross section and/or the position of one or more suction openings of the suction line is varied, by replacing a wall element of a line wall of the suction line provided with one or more suction openings with a wall element of which the suction opening(s) differ(s), with regard to the opening width of the flow cross section thereof and/or with regard to the position thereof in the installed position, from the suction opening(s) on the wall element to be replaced. The new wall element is selected from a plurality of available wall elements and is, instead of the hitherto installed wall element, releasably combined with a permanently attached wall part of the suction line to form the line wall of the suction line.

In a preferred embodiment of the present disclosure, it is provided that the line wall of the suction line has a plurality of releasable and consequently replaceable wall elements. If a plurality of releasable wall elements can be connected simultaneously to the permanently attached wall part and if these releasable wall elements differ from one another with regard to the position assumed in the installation situation, then the suction conditions set by the releasable wall elements can also be varied by interchanging the releasable wall elements.

Additionally or alternatively, a further development of the present disclosure provides that the opening width of the flow cross section of one or more suction openings can be modified by advancing a line wall of the suction line provided with one or more through openings for the waste air flow and an adjustment element likewise provided with at least one through opening for the waste air flow in an advancing direction extending perpendicular to the flow direction of the waste air flow. Through openings on the line wall of the suction line and on the adjustment element are associated with one another in pairs, where the through openings associated with one another on the line wall of the suction line and on the adjustment element overlap one another transversely to the flow direction of the waste air flow. Depending on the extent of the mutual overlap of the through openings on both sides, which can be adjusted by the advancing movement of the line wall of the suction line and/or of the adjustment element, an opening width is produced of the resulting flow cross section of the suction opening(s) of the suction line formed by the through openings on the line wall of the suction line and on the adjustment element.

In a further embodiment of the present disclosure, a plurality of adjustment elements having one or more through openings are provided, which adjustment elements can be advanced for adjustment as required of the opening width of the flow cross section of the suction opening(s) of the suction line relative to the line wall of the suction line provided with one or more through openings for the waste air flow and/or relative to one another transversely to the flow direction of the waste air flow.

In some embodiments, a change to the opening width of the cross section of the suction opening(s) can be accompanied by a change to the position of the suction opening(s) on the suction line. The line wall of the suction line can be formed in the region provided with the adjustment element (s) by a releasable wall element connected to a wall part of the line wall permanently attached to the workpiece support. To produce an easily releasable connection to the permanently attached wall part of the line wall or to the line wall, the replaceable releasable wall elements and the adjustment element(s) can be inserted into a guide on the permanently attached wall part of the line wall or on the line wall.

In a preferred embodiment of the present disclosure, the adjustment elements and also the releasable wall elements of the suction line are designed as planar sheet metal parts having one or more through openings or suction openings. Such sheet metal parts can be produced by the user of the workpiece support according to the present disclosure or the machine tool according to the present disclosure in a manner tailored to the specific machining task.

In a further embodiment of the present disclosure, a variation of the opening width of the flow cross section of one or more suction openings of the suction line by mutual advancing of a line wall of the suction line provided with at least one through opening and one or more adjustment element(s) in each case provided with at least one through opening is achieved in that through openings which are associated with one another to produce a resulting flow cross section have different cross-sectional geometries.

For simple handling during the adjustment of the opening width of the flow cross section of one or more suction openings of the suction line, the adjustment element(s) and/or the line wall of the suction line can be guided relative to one another in the advancing direction on a guide structure of the workpiece support.

In some embodiments, the mutual advancing of a line wall of the suction line provided with at least one through opening and of one or more adjustment element(s) in each case provided with at least one through opening takes place by a motorized advancing drive which can be actuated in a controlled manner. A hydraulic or pneumatic piston/cylinder arrangement may be used as a motorized advancing drive. The control of the motorized advancing drive is preferably integrated into a higher-level numerical control of the machine tool according to the present disclosure. Moreover, information concerning the machining tasks which are to be performed, and to which the suction conditions on a suction line are to be tailored, can be stored in the higher-level machine control. Alternatively the possibility exists of manually mutually advancing the line wall of the suction line and of the adjustment element(s).

In a further preferred embodiment of the present disclosure the opening occupancy rate by which the suction line is provided with suction openings varies in the flow direction of the waste air flow. In this way the suction is tailored according to the present disclosure to the requirements of specific machining tasks. In a region of the suction line having a high occupancy rate and, resulting therefrom, a large overall opening width of the flow cross sections of the suction openings a higher suction power is available than in a region of the suction line having a lesser occupancy rate and, as a result, a smaller overall opening width of the suction openings. Moreover, the location at which a greater or a lesser suction power is available can be influenced by a variation of the occupancy rate of the suction openings. For instance, for provision of a homogeneous suction power over the length of a suction line, in the event of an identical opening width of the flow cross sections of the participating suction openings, the occupancy rate can be increased as the distance from the vacuum source of the suction device increases. The pressure loss associated with an increase in the distance of the location of the extraction of waste air from the vacuum source is compensated for by the increase of the occupancy rate of the suction openings.

In some embodiments, a suction device having a plurality of suction lines is provided on the workpiece support according to the present disclosure, where the suction lines are associated with different surface regions of the workpiece support element. On at least one of the suction lines the opening width of the flow cross section of the suction opening(s) and/or the position of the suction opening(s) is variably adjustable in the above-mentioned manner.

In a preferred further embodiment of the workpiece support according to the present disclosure with suction lines associated with different surface regions of the workpiece support element, the opening width of the flow cross section of the suction opening(s) and/or the position of the suction opening(s) on suction lines assigned to a plurality of different surface regions of the workpiece support element can be varied separately.

Another aspect of the present disclosure features a machine tool provided with such a workpiece support. The adjustability of the suction conditions on different suction lines of the suction device independently of one another is used to adjust, in a targeted manner and as required, the suction conditions on the suction line associated with the surface region of the workpiece support element used for the machining of a workpiece.

In a further embodiment of the workpiece support according to the present disclosure the possibility exists that at least one of the suction lines associated with different surface regions of the workpiece support element is selectively connected to the vacuum generator of the suction device or disconnected from the vacuum generator of the suction device and thereby deactivated.

If a plurality of suction lines associated with different surface regions of the workpiece support element, independently of one another, can be connected to the vacuum generator of the suction device or disconnected from the vacuum generator of the suction device, the possibility exists in a particular manner of tailoring the suction power of the suction according to the present disclosure to specific machining tasks.

The machine tool according to the present disclosure can make use of this possibility. In the case of this embodiment of the present disclosure, only the suction line for the surface region of the workpiece support element on which machining of a workpiece takes place is connected to the vacuum generator of the suction device. The suction lines for the remaining surface regions of the workpiece support element are disconnected from the vacuum generator of the suction device and consequently do not provide any suction power.

The term "at least one of A or B" can be used interchangeably with the term "A and/or B" in the present disclosure, and represents "A or B or both A and B" herein.

Further advantages of the present disclosure emerge from the description and the drawings. Likewise, the features specified above and the features yet to be listed below can find use both on their own and together in any combinations. The shown and described embodiments should not be considered an exhaustive list but, instead, have an exemplary character for the purposes of explaining the present disclosure.

DETAILED DESCRIPTION

Figure 1:
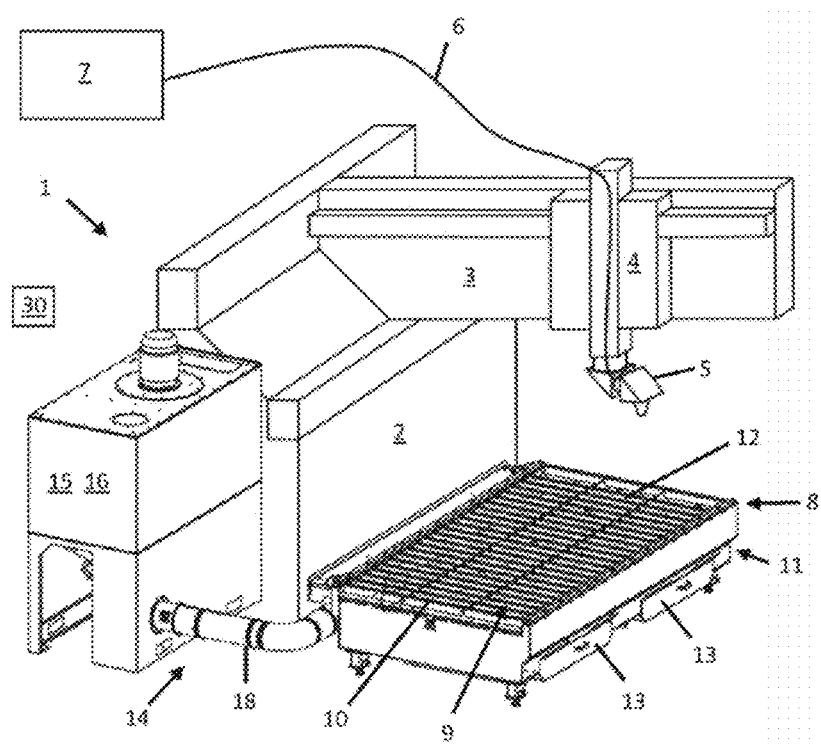
FIG. 1 shows a machine tool for machining a metal sheet with a workpiece support.

A machine tool illustrated in FIG. 1 is designed as a laser cutting machine 1 and serves for machining metal sheets by cutting. The laser cutting machine 1 includes a machine body 2 as well as a cantilever 3 which projects forwards from the machine body 2 and is movable along the machine body 2. A moving unit 4 can be moved horizontally on the cantilever 3 in the longitudinal direction thereof. The moving unit 4 in turn guides a laser cutting head 5 which can be positioned in the vertical direction and is provided as a machining unit. The machine body 2, the cantilever 3, the moving unit 4 and the laser cutting head 5 form a machining device of the laser cutting machine 1. By a laser guide cable 6 the laser cutting head 5 is connected to a solid-state laser 7 which generates a laser beam directed as a cutting beam from the laser cutting head 5 onto a workpiece to be machined.

During the machining, a workpiece to be machined, in the present example a metal sheet (not shown), is placed on a workpiece support 8 which is arranged in front of the machine body 2 and over which the cantilever 3 of the laser cutting machine 1 projects.

The workpiece support 8 has, as a two-dimensional workpiece support element, a support grid 9, which is formed by support strips 10 which for their part extend in parallel with one another with mutual spacing on a box-like substructure 11 of the workpiece support 8. The upper side of the support grid 9 forms the workpiece side 12 thereof. On the workpiece side 12 the support grid 9 supports a metal sheet during the machining by the laser cutting head 5.

Figure 2:
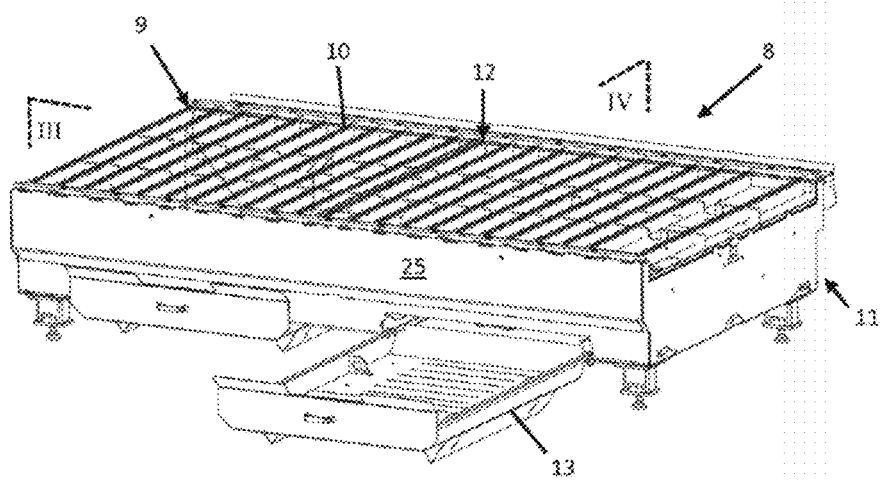
FIG. 2 shows the workpiece support according to FIG. 1 with an open slag/scrap tray.

Because of the spacing between the support strips 10, the support grid 9 is permeable in the vertical direction. Coarse pieces of waste, for instance coarse slag particles and correspondingly dimensioned metal waste, produced in the thermal machining of a metal sheet, fall downwards under the effect of gravity through the support grid 9 and thereby enter slag/scrap trays 13. The slag/scrap trays 13 are movably guided on the box-like substructure 11 of the workpiece support 8 in the horizontal direction and can be manually pulled out of the box-like substructure 11 for emptying. The workpiece support 8 is shown in FIG. 2 with a slag/scrap tray 13 pulled out.

In addition to the coarse pieces which enter the slag/scrap tray 13 under the effect of gravity, machining-related gases and fine solid particles produced during the sheet metal machining by the laser cutting head 5 are also discharged from the workpiece side 12 of the support grid 9. In some embodiments, the workpiece support 8 is provided with a suction device 14.

The suction device 14 can include, as vacuum generator, a vacuum pump 15 which is arranged in a structural unit with a dust extractor 16 alongside the machine body 2 of the laser cutting machine 1 (FIG. 1). A collecting line 18 of the suction device 14 extends from the dust extractor 16 to the box-like substructure 11 of the workpiece support 8.

Figure 3:
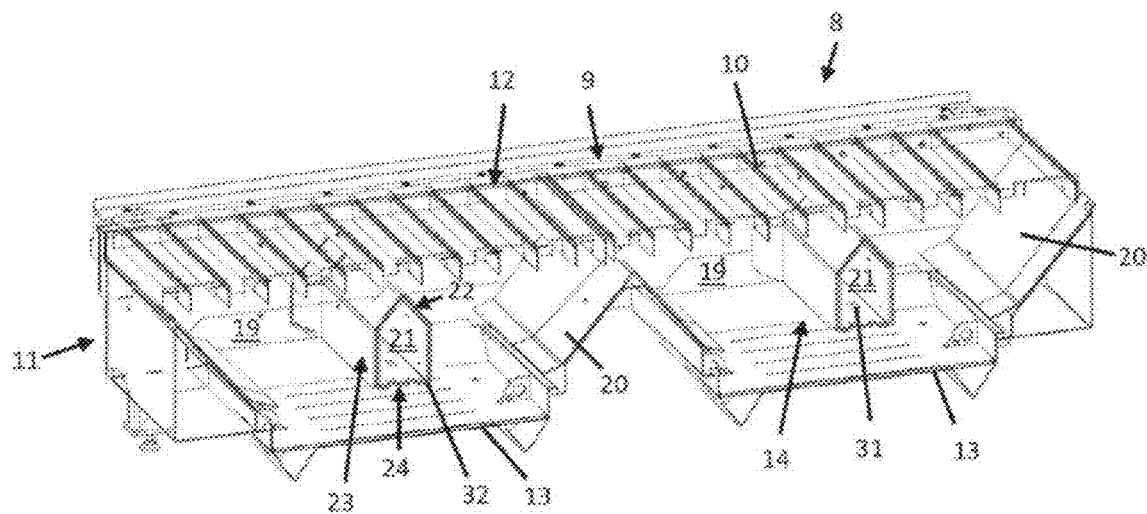
FIG. 3 shows a sectional representation of the workpiece support according to FIGS. 1 and 2 with a section plane III indicated in FIG. 2.

According to FIG. 3 two suction compartments 19 are formed on the lower side of the support grid 9 in the interior of the box-like substructure 11. Towards the bottom, the suction compartments 19 are delimited in each case by one of the slag/scrap trays 13. As lateral boundaries of the suction compartments 19, guide plates 20 are provided, by which coarse pieces coming from the workpiece side 12 of the support rack 9 are delivered to the slag/scrap tray 13.

A suction line 21 in each case extends below the support grid 9 at a central point in the suction compartments 19. The suction lines 21 extend in parallel with the support strips 10 of the support grid 9.

The suction lines 21 have a house-shaped configuration. A line wall 22 of the suction lines 21 includes a wall part 23 permanently attached to the workpiece support 8 as well as a releasable wall element which forms a base 24 of the suction lines 21.

Figure 4:
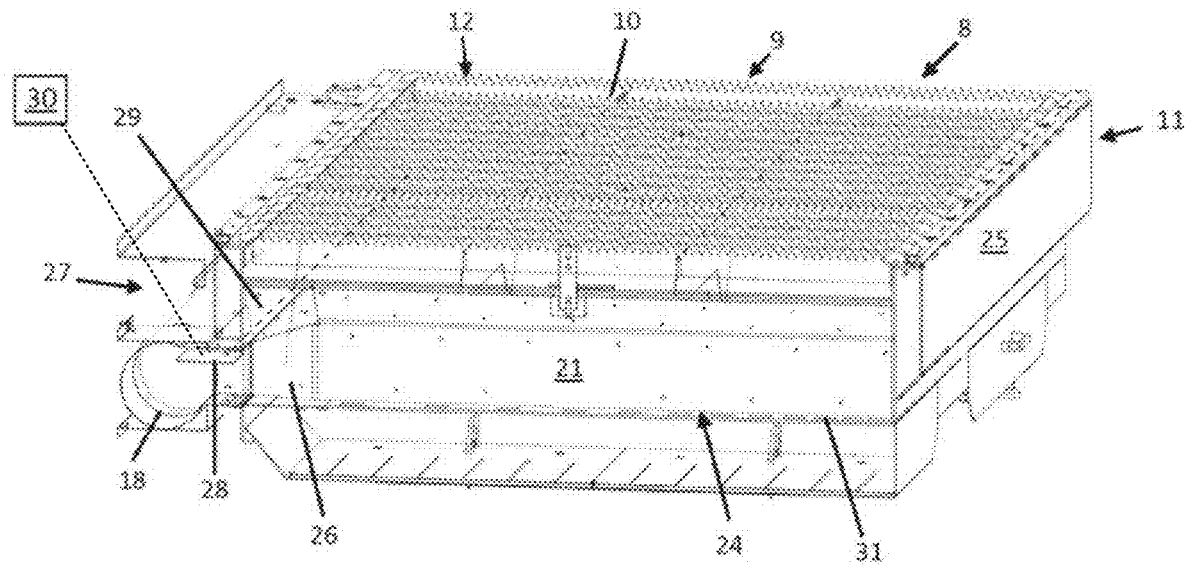
FIG. 4 shows a sectional representation of the workpiece support according to FIGS. 1 and 3 with a section plane IV indicated in FIG. 2.

At their front end opposite the machine body 2 of the laser cutting machine 1, the suction lines 21 are closed by an end plate 25 (FIGS. 2, 4) of the box-like substructure 11 of the workpiece support 8. On the opposing rear longitudinal end the suction lines 21 are in each case connected by a connecting piece 26 to the collecting line 18 of the suction device 14 (FIG. 4). Each of the connecting pieces 26 has a flap 28 as a locking device unit of a locking device (or a locker) 27. For each of the flaps 28 a separate drive motor (not shown) is provided, by which the respective flap 28 can be pivoted about a horizontal pivot axis 29 as required into a vertical or horizontal position. In a vertical orientation the flaps 28 are in a locking state, and in a horizontal orientation they are in an open state.

The drive motors of the flaps 28 can be actuated independently of one another.

For controlling the drive motors of the flaps 28 a numerical control unit (or numerical controller) is provided, which is integrated into a higher-level numerical machine control (or numerical machine control system) 30 of the laser cutting machine 1. The numerical machine control 30 is illustrated schematically in FIGS. 1 and 4.

The bases 24 of the suction lines 21, which can be seen to some extent in FIG. 3, are provided with suction openings 31 over their entire length. If the flap 28 of the locking device 27 associated with a suction line 21 is pivoted into the open position and if the vacuum pump 15 of the suction device 14 is switched on, the vacuum generated by the vacuum pump 15 is applied via the dust extractor 16, the collecting line 18 and the relevant connecting piece 26 to the interior of the suction line 21. Under the action of the vacuum applied to the suction line 21, machining-related gases and fine solid particles accumulating on the workpiece side 12 of the support grid 9 are sucked off in the surface region of the support grid 9 associated with the suction line 21.

Due to the vacuum in the interior of the suction line 21 a waste air flow is generated which is loaded with the emissions accumulating on the workpiece side 12 of the support grid 9 and is directed from the workpiece side 12 towards the lower side of the support grid 9. On the lower side of the support grid 9 the waste air flow is sucked off through the suction openings 31 of the suction line 21 into the interior of the suction line 21. From there the waste air flow enters the dust extractor 16 of the suction device 14 via the connecting piece 26 and the collecting line 18.

The base 24 of the suction lines 21 offers a possibility of varying the suction power available on the lower side of the support grid 9 of the workpiece support 8 and generated by the vacuum pump 15 both with regard to its scale and also with regard to the location where it is available. In some embodiments, the base 24 of the suction line 21 is releasably connected to the wall part 23 of the line wall 22 permanently attached to the workpiece support 8. In the illustrated example the base 24 of the suction line 21 is inserted into a guide 32 provided on the wall part 23 of the line wall 22. Consequently, if required, the base 24 can be removed, without fastening means (or fasteners) having to be released. In FIG. 3, the structurally identical suction lines 21 have identically configured bases 24.

Figure 5:
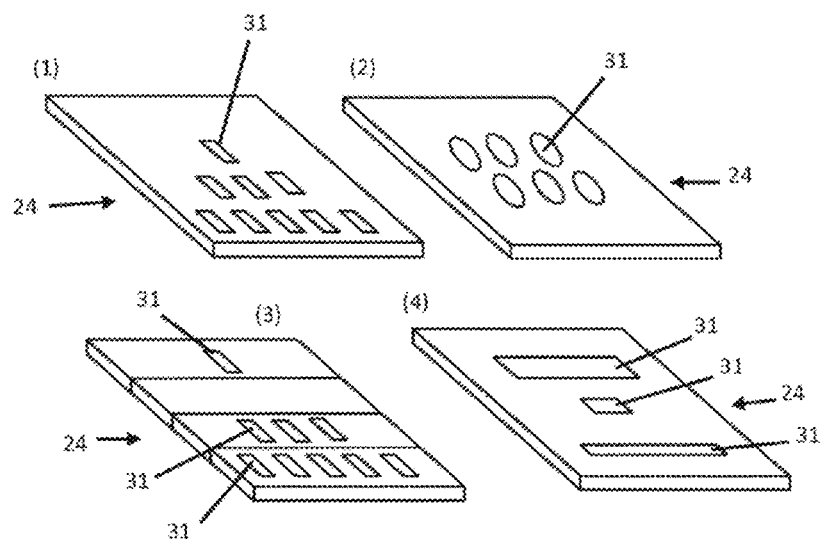
FIG. 5 shows four embodiments of a releasable wall element of a line wall of a suction line provided on the workpiece support according to FIGS. 1 to 4.

A total of four embodiments of the base 24, which in the illustrated example are available for selection as alternatives to the base 24 fitted in FIG. 3 for installation on the workpiece support 8, are illustrated in FIG. 5.

The bases 24 according to FIG. 5 differ from one another with regard to the geometry of the suction openings 31, with regard to the opening width of the flow cross section of the suction openings 31 and with regard to the position of the suction openings 31 on the respective base 24 and, associated therewith, with regard to the position which the suction openings 31 assume after the connection of the respective base 24 to the wall part 23 of the line wall 22 on the suction line 21.

Furthermore, the base 24 shown in the partial representation (3) of FIG. 5 is segmented, whilst the bases 24 of the partial representations (1), (2) and (4) of FIG. 5 are designed in one piece. The segmentation of the base 24 according to the partial representation (3) of FIG. 5 offers the possibility, for adaptation to the specific case of machining, to combine the individual segments of the base 24 with one another in different orders and thereby to influence the distribution of the suction power by the base 24 of the suction line 21.

The magnitude of the suction power provided on the lower side of the support grid 9 is adjustable by the surface ratio between the closed region of the installed base 24 and the sum of the opening widths of the flow cross sections of the suction openings 31 of the installed base 24. The location at which the suction power on the suction lines 21 is available can be varied by the position of the suction openings 31 on the suction lines 21.

By selection of the base 24 fitted to the wall part 23 of the line wall 22 it is possible to ensure that sufficient suction power is available on the suction lines 21 below the region of the support grid 9 of the workpiece support 8 in which the laser cutting head 5 machines a metal sheet placed on the support grid 9. In this case it can be ensured that the suction power is available to the required extent at a location of the suction line 21 which, for optimal sucking off of machining-related emissions, can be situated relative to the machining site of the laser-cutting beam on the machined workpiece.

The locking device 27 allows a basic setting of the suction conditions on the workpiece support 8. Since the two flaps 28 of the locking device 27 can be actuated independently of one another, the possibility exists of providing the suction power from the outset either in both suction compartments 19 or only in one of the two suction compartments 19. Depending on the requirements, either both flaps 28 are transferred into the open position or one of the flaps 28 can be pivoted into the open position and the other flap 28 can be pivoted into the closed position. In the open position of a flap 28 the associated suction line 21 is connected to the vacuum pump 15 of the suction device 14. If a flap 28 is closed, the associated suction line 21 is disconnected from the vacuum pump 15 of the suction device 14.

Before the start of a machining process, the base 24, e.g., selected from among the bases 24 shown in FIG. 5, is inserted into the guide 32 on the wall part 23 of the line wall 22 and remains there until completion or until an interruption of the machining process. Only then can the suction conditions be changed by replacing the base 24 inserted into the guide 32 with another of the bases 24 available for selection.

FIGS. 6 to 9 show arrangements by which the suction conditions can be modified not only outside, but also during an ongoing machining process with respect to the suction power available on the suction lines 21 and/or with respect to the location where the suction power is available.

Figure 6:
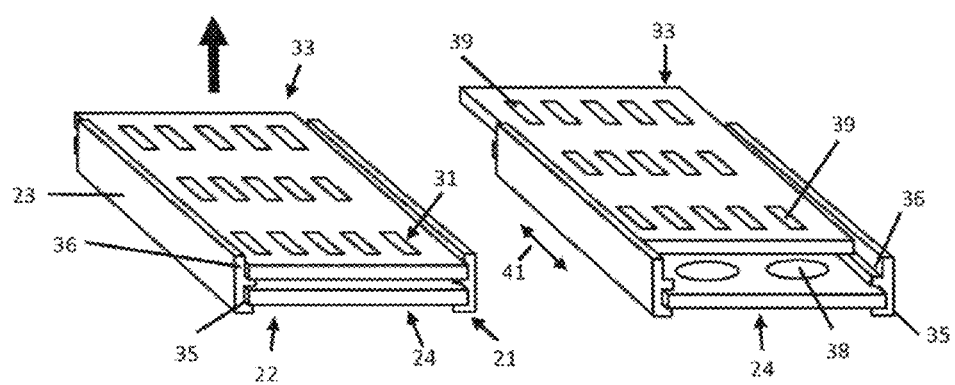
FIG. 6 shows a part, formed by a releasable wall element, of a line wall of a suction line provided on the workpiece support according to FIGS. 1 to 4 with an adjustment element advanced into two different positions relative to the wall element.
Figure 7:
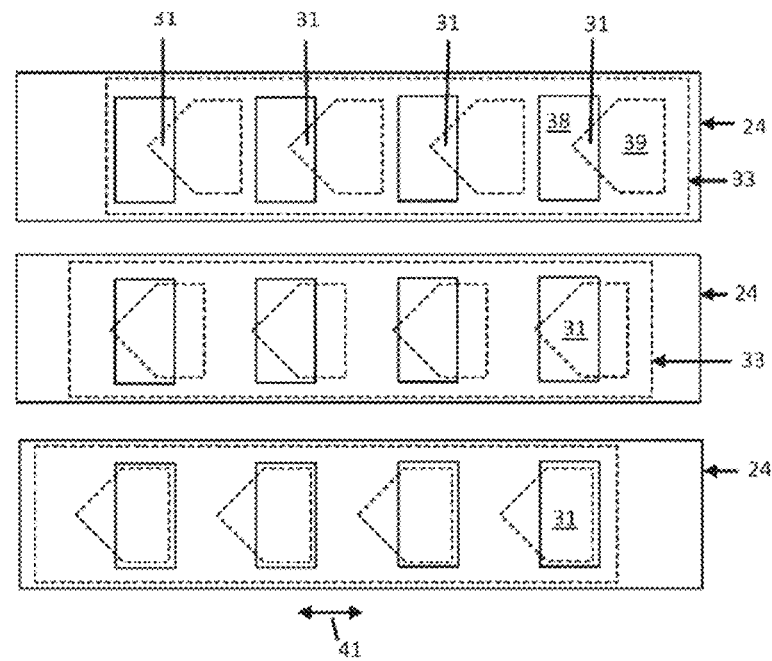
FIG. 7 shows a first embodiment of a wall part of a line wall of a suction line provided on the workpiece support according to FIGS. 1 to 4 together with a first embodiment of an adjustment element which is adjacent to the wall part and advanced into three different positions relative to the wall part.
Figure 8:
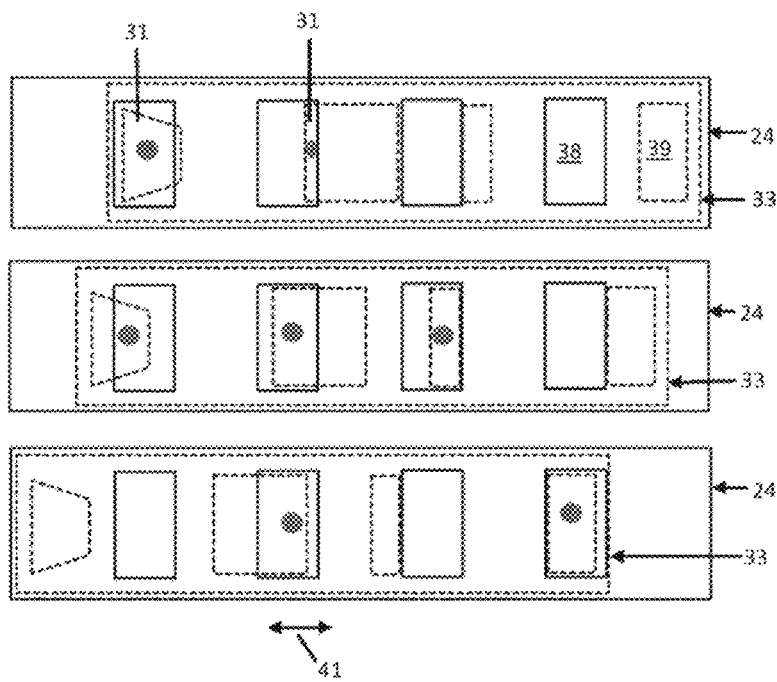
FIG. 8 shows the wall part of the line wall according to FIG. 7 together with a second embodiment of an adjustment element which is adjacent to the wall part and advanced into three different positions relative to the wall part.

According to FIGS. 6 to 8, a base 24 of the relevant suction line 21 forming a part of the line wall 22 is combined with an adjustment element (or adjuster) 33 which is adjacent to the base 24 in the flow direction of the waste air flow generated by the vacuum pump 15 represented by an arrow in FIG. 6.

Figure 9:
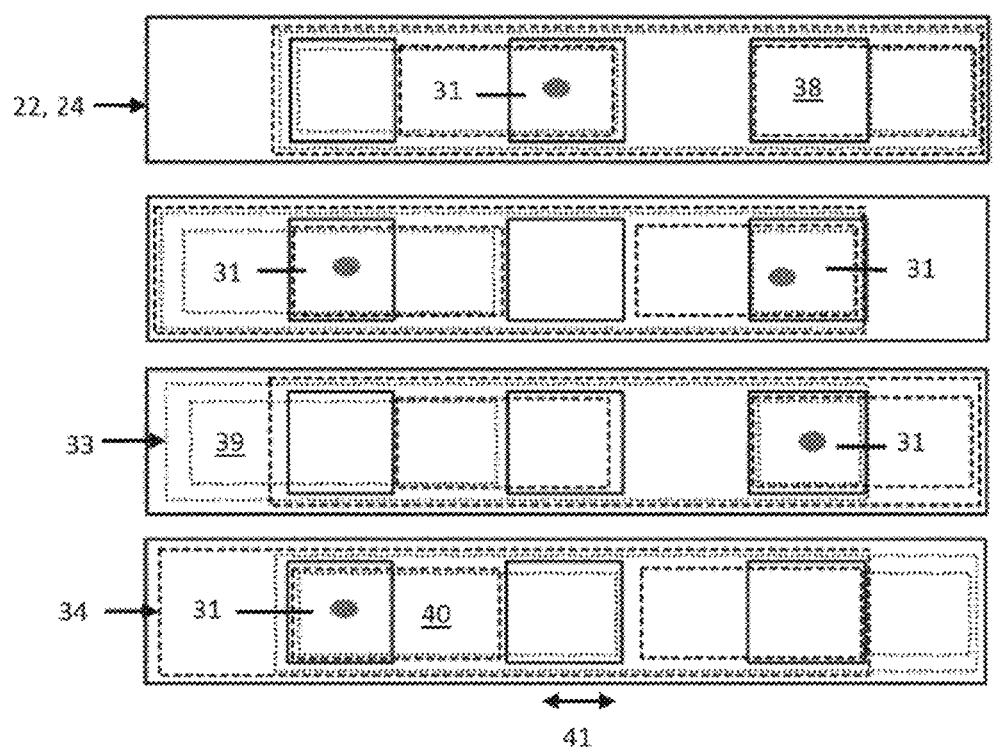
FIG. 9 shows a second embodiment of a wall part of a line wall of a suction line provided on the workpiece support according to FIGS. 1 to 4 together with two adjustment elements of a third embodiment which adjustment elements are adjacent to the wall part and advanced into different positions relative to the wall part and relative to one another.

In FIG. 9 the base 24 of a suction line 21 forming a part of the line wall 22 is combined with a first adjustment element 33 and a further adjustment element 34. The contours on the base 24 are represented by solid lines, the contours on the adjustment element 33 are represented by dotted lines and the contours on the further adjustment element 34 are represented by broken lines.

The base 24 and the two adjustment elements 33, 34 are adjacent to one another in the flow direction of the waste air flow generated by the vacuum pump 15. The base 24 and the adjustment element 33 of FIGS. 6 to 8 are inserted into guides 35, 36 on the wall part 23 of the line wall 22. In the case of the arrangement according to FIG. 9 an additional guide for the further adjustment element 34 is provided on the wall part 23 of the line wall 22.

According to FIGS. 6 to 9 the base 24 is provided with through openings 38 and the adjustment elements 33, 34 are provided with through openings 39, 40. The through openings 38, 39, 40 overlap one another perpendicular to the flow direction of the waste air flow generated by the suction device 14. The flow cross section of the suction openings 31 is formed as the resulting flow cross section of the through openings 38, 39 or the through openings 38, 39, 40. The geometry of the flow cross section of the through openings 38 on the base 24 differs from the geometry of the flow cross section of the through openings 39, 40 on the adjustment elements 33, 34. Moreover, the geometries of the through openings 39 on the adjustment element 33, on the one hand, and the through openings 40 on the adjustment element 34, on the other hand, differ from one another.

As can be seen from FIGS. 6 to 9, the opening width and partially also the position of the suction openings 31 can be influenced by changing the position in which the base 24 of the suction line 21, the adjustment element 33 and, if applicable, the adjustment element 34 are located relative to one another. This position can be changed by displacing the adjustment elements 33, 34 relative to the base 24 and/or relative to one another in an advancing direction illustrated in FIGS. 6 to 9 by a double arrow 41.

The mutual positioning of the base 24 and of the adjustment elements 33, 34 can be performed on each of the suction lines 21 by a separate numerically controlled positioning motor (not shown). The control of the positioning motors for the base 24 and the adjustment elements 33, 34 of the suction lines 21 is coordinated with the control of the machining process carried out on the workpiece side of the support grid 9. A control unit (or controller) for the positioning motors can be integrated into the higher-level machine control 30.

Other Embodiments

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A workpiece support of a machine tool for machining workpieces, the workpiece support comprising:
    a workpiece support device having a workpiece side for supporting a workpiece during machining of the workpiece and a lower side remote from the workpiece side, wherein, from the workpiece side towards the lower side, the workpiece support device is permeable to a waste air flow loaded with machining-related emissions; and
    a suction device comprising a vacuum generator and a suction line, wherein the vacuum generator is configured to:
        generate the waste air flow directed from the workpiece side towards the lower side of the workpiece support device,
        suck off the waste air flow into the suction line in a flow direction, and
        subsequently discharge the waste air flow via the suction line,
        wherein the suction line has a suction opening on a support device side arranged downstream of the workpiece side of the workpiece support device, and a flow cross section of the suction opening has an opening width,
    wherein the suction line is configured such that the waste air flow in the flow direction is capable of passing through the flow cross section of the suction opening of the suction line, and wherein at least one of the opening width of the flow cross section or a position of the suction opening on the suction line is variably adjustable,
    wherein the suction line has a multipart line wall comprising a plurality of wall parts, and wherein one of the plurality of wall parts is configured to be a releasable wall element and is releasably connected to a wall part of the multipart line wall that is permanently attached to the workpiece support,
    wherein a plurality of releasable wall elements are available for selection, and each of the available releasable wall elements has a suction opening having a flow cross section with an opening width,
    wherein the available releasable wall elements are configured such that at least one of:
        the opening widths of the flow cross sections of the suction openings on the available releasable wall elements are differently dimensioned, or
        when each of the available releasable wall elements is selectively releasably connected to the wall part of the multipart line wall permanently attached to the workpiece support, the suction opening of the selected available releasable wall element is positioned differently on the multipart line wall, and
    wherein at least one of the opening width of the flow cross section of the suction opening of the suction line or the position of the suction opening on the suction line is variably adjustable because one of the available releasable wall elements is selectively releasably connectable to the wall part of the multipart line wall of the suction line permanently attached to the workpiece support.

2. The workpiece support of claim 1, wherein the suction line has the suction opening on the support device side arranged downstream of the workpiece side of the workpiece support device as a first suction opening and, in addition to the first suction opening, has at least one second suction opening on the support device side arranged downstream of the workpiece side of the workpiece support device,
    wherein the second suction opening has a flow cross section having an opening width, and the suction line is configured such that the waste air flow in the flow direction is capable of passing through the flow cross section of the second suction opening of the suction line, and
    wherein at least one of the opening width of the flow cross section of the second suction opening of the suction line or a position of the second suction opening on the suction line is variably adjustable.

3. The workpiece support of claim 2,
wherein each of the available releasable wall elements has a first suction opening and at least one second suction opening,
wherein the available releasable wall elements are configured such that at least one of:
    opening widths of flow cross sections of the first suction opening and the second suction opening on the available releasable wall elements are differently dimensioned, or
    when each of the available releasable wall elements is selectively releasably connected to the wall part of the multipart line wall permanently attached to the workpiece support, at least one suction opening of the first suction opening and of the second suction opening of the available releasable wall element is positioned differently on the multipart line wall, and
wherein at least one of the opening widths of the flow cross sections of the first suction opening of the suction line and the second suction opening of the suction line or a position of at least one of the first and second suction openings on the suction line are variably adjustable, because one of the available releasable wall elements is selectively releasably connectable to the wall part of the line wall of the suction line permanently attached to the workpiece support.

4. The workpiece support of claim 2, wherein the suction line is provided with suction openings with an occupancy rate which is variable in the flow direction of the waste air flow.

5. The workpiece support of claim 1, wherein the suction device comprises the suction line as a first suction line and, in addition to the first suction line, at least one further suction line,
    wherein the first suction line and the further suction line are respectively associated with different surface regions of the workpiece support device, and wherein by the first suction line and the further suction line a waste air flow is dischargeable from the workpiece side of the respectively associated surface regions of the workpiece support device, and
    wherein, on at least one of the suction lines, at least one of the opening width of the flow cross section of the suction opening or the position of the suction opening on the suction line is variably adjustable.

6. The workpiece support of claim 5, wherein at least one of the opening width of the flow cross section of the suction opening on the first suction line or the position of the suction opening on the first suction line is variably adjusted independently from at least one of the opening width of the flow cross section of the suction opening on the further suction line or the position of the suction opening on the further suction line.

7. The workpiece support of claim 5, wherein at least one of the first suction line or the further suction line is provided with a locking device configured to be actuated by a controller to be transferred into one of a locking state and an open state, and wherein the at least one of the first suction line or the further suction line is configured to be disconnected from the vacuum generator of the suction device when the locking device is in the locking state and be connected to the vacuum generator of the suction device when the locking device is in the open state.

8. The workpiece support of claim 7, wherein the locking device comprises:
    a first locking device unit associated with the first suction line, and
    a further locking device unit associated with the further suction line,
    wherein the first locking device unit and the further locking device unit are configured to be actuated independently of one another to be transferred into one of a locking state and an open state.

9. A workpiece support of a machine tool for machining workpieces, the workpiece support comprising:
    a workpiece support device having a workpiece side for supporting a workpiece during machining of the workpiece and a lower side remote from the workpiece side, wherein, from the workpiece side towards the lower side, the workpiece support device is permeable to a waste air flow loaded with machining-related emissions; and
    a suction device comprising a vacuum generator and a suction line, wherein the vacuum generator is configured to:
        generate the waste air flow directed from the workpiece side towards the lower side of the workpiece support device,
        suck off the waste air flow into the suction line in a flow direction, and
        subsequently discharge the waste air flow via the suction line,
    wherein the suction line has a suction opening on a support device side arranged downstream of the workpiece side of the workpiece support device, and a flow cross section of the suction opening has an opening width,
    wherein the suction line is configured such that the waste air flow in the flow direction is capable of passing through the flow cross section of the suction opening of the suction line, and wherein at least one of the opening width of the flow cross section or a position of the suction opening on the suction line is variably adjustable,
    wherein the suction opening of the suction line is formed by two through openings each having a flow cross section,
    wherein a first through opening of the two through openings is provided on a line wall of the suction line and a second through opening of the two through openings is provided on an adjustment element adjacent to the line wall of the suction line in the flow direction of the waste air flow,
    wherein the two through openings provided on the line wall of the suction line and on the adjustment element overlap one another transversely to the flow direction of the waste air flow, such that the flow cross section of the suction opening of the suction line is formed as a resulting flow cross section of the suction opening of the suction line from the flow cross sections of the two through openings and such that the waste air flow is capable of passing through the resulting flow cross section of the suction opening of the suction line in the flow direction, and wherein the opening width of the resulting flow cross section of the suction opening of the suction line is variably adjustable, because the line wall of the suction line and the adjustment element are able to be advanced relative to one another in an advancing direction extending transversely to the flow direction of the waste air flow to thereby cause a variable mutual overlap of the two through openings transversely to the flow direction.

10. The workpiece support of claim 9, wherein the adjustment element is provided as a first adjustment element, wherein the workpiece support further comprises at least one further adjustment element that is adjacent, in the flow direction of the waste air flow, to at least one of the line wall of the suction line or the first adjustment element, the at least one further adjustment element having a further through opening, wherein the suction opening of the suction line is formed by the two through openings and the further through opening provided on the line wall of the suction line and on the first adjustment element and the at least one further adjustment element, wherein the two through openings and the further through opening provided on the line wall of the suction line and on the first adjustment element and the at least one further adjustment element overlap one another transversely to the flow direction of the waste air flow, such that the flow cross section of the suction opening of the suction line is formed as a second resulting flow cross section of the suction opening of the suction line from the flow cross sections of the two through openings and the further through opening provided on the line wall of the suction line and on the first adjustment element and the at least one further adjustment element and such that the waste air flow is capable of passing through the second resulting flow cross section of the suction opening of the suction line in the flow direction, and wherein an opening width of the second resulting flow cross section of the suction opening of the suction line is variably adjustable, because the line wall of the suction line and the first adjustment element as well as the further adjustment element are able to be advanced relative to one another in an advancing direction to thereby cause a variable mutual overlap transversely to the flow direction of the waste air flow of the two through openings and the further through opening provided on the line wall of the suction line and on the first adjustment element and the at least one further adjustment element.

11. The workpiece support of claim 10, wherein the suction line and the adjustment elements are configured such that at least one of:

the first through opening provided on the line wall of the suction line has a different cross-sectional geometry from the second through opening provided on the first adjustment element and the further through opening provided on the further adjustment element, or the second through opening provided on the first adjustment element and the further through opening provided on the further adjustment element have different cross-sectional geometries.

12. The workpiece support of claim 9, wherein the adjustment element and the line wall of the suction line are configured to be advanced and guided relative to one another in the advancing direction on a guide structure of the workpiece support.

13. The workpiece support of claim 9, wherein the adjustment element and the line wall of the suction line are configured to be advanced relative to one another in the advancing direction by a motorized advancing drive that is actuatable by a controller.

14. The workpiece support of claim 9, wherein the suction line has the suction opening on the support device side arranged downstream of the workpiece side of the workpiece support device as a first suction opening and, in addition to the first suction opening, has at least one second suction opening on the support device side arranged downstream of the workpiece side of the workpiece support device, wherein the second suction opening has a flow cross section having an opening width, and the suction line is configured such that the waste air flow in the flow direction is capable of passing through the flow cross section of the second suction opening of the suction line, and wherein at least one of the opening width of the flow cross section of the second suction opening of the suction line or a position of the second suction opening on the suction line is variably adjustable.

15. The workpiece support of claim 14, wherein the first suction opening of the suction line is formed by two first through openings each having a flow cross section, and wherein the second suction opening of the suction line is formed by two second through openings each having a flow cross section, wherein of the two first through openings one first through opening is provided on the line wall of the suction line and the other first through opening is provided on an adjustment element adjacent to the line wall of the suction line in the flow direction of the waste air flow, wherein the two first through openings provided on the line wall of the suction line and on the adjustment element overlap one another transversely to the flow direction of the waste air flow, such that the flow cross section of the first suction opening of the suction line is formed as a first resulting flow cross section of the first suction opening of the suction line from the flow cross sections of the two first through openings, and such that the waste air flow is capable of passing through the resulting flow cross section of the first suction opening of the suction line in the flow direction, wherein of the two second through openings one second through opening is provided on the line wall of the suction line and the other second through opening is provided on the adjustment element adjacent to the line wall of the suction line in the flow direction of the waste air flow, wherein the two second through openings provided on the line wall of the suction line and on the adjustment element overlap one another transversely to the flow direction of the waste air flow, such that the flow cross section of the second suction opening of the suction line is formed as a second resulting flow cross section of the second suction opening of the suction line from the flow cross sections of the two second through opening and such that the waste air flow is capable of passing through the resulting flow cross section of the second suction opening of the suction line in the flow direction, and wherein opening widths of the first and second resulting flow cross sections of the first suction opening of the suction line and of the second suction opening of the suction line are variably adjustable, because the line wall of the suction line and the adjustment element are able to be advanced relative to one another in an advancing direction to thereby cause a variable mutual overlap of the two first through openings transversely to the flow direction of the waste air flow and a variable mutual overlap of the two second through openings transversely to the flow direction of the waste air flow.

16. The workpiece support of claim 15, wherein the adjustment element is provided as a first adjustment element, wherein the workpiece support further comprises at least one further adjustment element that is adjacent, in the flow direction of the waste air flow, to at least one of the line wall of the suction line or the first adjustment element, the at least one further adjustment element having a further first through opening and a further second through opening, wherein the two first through openings and the further first through opening provided on the line wall of the suction line and on the first adjustment element and the at least one further adjustment element overlap one another transversely to the flow direction of the waste air flow, and wherein the two second through openings and the further second through opening provided on the line wall of the suction line and on the first adjustment element and the at least one further adjustment element overlap one another transversely to the flow direction of the waste air flow, and wherein the opening widths of the first and second resulting flow cross sections of the first suction opening of the suction line and the second suction opening of the suction line are variably adjustable, because the line wall of the suction line and the first adjustment element as well as the further adjustment element are able to be advanced relative to one another in the advancing direction to thereby cause a further variable mutual overlap of the two first through openings and the further first through opening provided on the line wall of the suction line and on the first adjustment element and the at least one further adjustment element, and a further variable mutual overlap of the two second through openings and the further second through opening provided on the line wall of the suction line and on the first adjustment element and the at least one further adjustment element.

17. The workpiece support of claim 14, wherein the suction line is provided with suction openings with an occupancy rate which is variable in the flow direction of the waste air flow.

18. The workpiece support of claim 9, wherein the suction device comprises the suction line as a first suction line and, in addition to the first suction line, at least one further suction line, wherein the first suction line and the further suction line are respectively associated with different surface regions of the workpiece support device, and wherein by the first suction line and the further suction line a waste air flow is dischargeable from the workpiece side of the respectively associated surface regions of the workpiece support device, and wherein, on at least one of the suction lines, at least one of the opening width of the flow cross section of the suction opening or the position of the suction opening on the suction line is variably adjustable.

19. The workpiece support of claim 18, wherein at least one of the opening width of the flow cross section of the suction opening on the first suction line or the position of the suction opening on the first suction line is variably adjusted independently from at least one of the opening width of the flow cross section of the suction opening on the further suction line or the position of the suction opening on the further suction line.

20. The workpiece support of claim 18, wherein at least one of the first suction line or the further suction line is provided with a locking device configured to be actuated by a controller to be transferred into one of a locking state and an open state, and wherein the at least one of the first suction line or the further suction line is configured to be disconnected from the vacuum generator of the suction device when the locking device is in the locking state, and to be connected to the vacuum generator of the suction device when the locking device is in the open state.

21. The workpiece support of claim 20, wherein the locking device comprises:

a first locking device unit associated with the first suction line, and a further locking device unit associated with the further suction line, wherein the first locking device unit and the further locking device unit are configured to be actuated independently of one another to be transferred into one of a locking state and an open state.

22. A machine tool for machining workpieces, comprising:

a machining device; and a workpiece support configured to support a workpiece during machining by the machining device, wherein the workpiece support comprises:

a workpiece support device having a workpiece side for supporting the workpiece during the machining of the workpiece and a lower side remote from the workpiece side, wherein, from the workpiece side towards the lower side, the workpiece support device is permeable to a waste air flow loaded with machining-related emissions; and a suction device comprising a vacuum generator and a suction line, wherein the vacuum generator is configured to:

generate the waste air flow directed from the workpiece side towards the lower side of the workpiece support device, suck off the waste air flow into the suction line in a flow direction, and subsequently discharge the waste air flow via the suction line, wherein the suction line has a suction opening on a support device side arranged downstream of the workpiece side of the workpiece support device, and a flow cross section of the suction opening has an opening width, wherein the suction line is configured such that the waste air flow in the flow direction is capable of passing through the flow cross section of the suction opening of the suction line, and wherein at least one of the opening width of the flow cross section or a position of the suction opening on the suction line is variably adjustable,
wherein the suction line has a multipart line wall comprising a plurality of wall parts, and wherein one of the plurality of wall parts is configured to be a releasable wall element and is releasably connected to a wall part of the multipart line wall that is permanently attached to the workpiece support,
wherein a plurality of releasable wall elements are available for selection, and each of the available releasable wall elements has a suction opening having a flow cross section with an opening width,
wherein the available releasable wall elements are configured such that at least one of:
the opening widths of the flow cross sections of the suction openings on the available releasable wall elements are differently dimensioned, or
when each of the available releasable wall elements is selectively releasably connected to the wall part of the multipart line wall permanently attached to the workpiece support, the suction opening of the selected available releasable wall element is positioned differently on the multipart line wall, and
wherein the at least one of the opening width of the flow cross section of the suction opening of the suction line or the position of the suction opening on the suction line is variably adjustable because one of the available releasable wall elements is selectively releasably connectable to the wall part of the multipart line wall of the suction line permanently attached to the workpiece support.

23. The machine tool of claim 22, wherein the machining device has a machining unit configured to be advanced in parallel with the workpiece support device into a machining position, and
wherein the suction device comprises the suction line as a first suction line and a further suction line.

24. The machine tool of claim 23, wherein, on at least one of the first suction line and the further suction line, at least one of the opening width of the flow cross section of the suction opening or the position of the suction opening is variably adjustable depending on the machining position of the machining unit.

25. The machine tool of claim 23, wherein at least one of the first suction line or the further suction line is provided with a locking device configured to be actuated by a controller to be transferred into one of a locking state and an open state,
wherein the at least one of the first suction line or the further suction line is configured to be disconnected from the vacuum generator of the suction device when the locking device is in the locking state and be connected to the vacuum generator of the suction device when the locking device in the open state,
wherein the locking device comprises a first locking device unit associated with the first suction line and a further locking device unit associated with the further suction line,
wherein the first locking device unit and the further locking device unit are configured to be actuated independently of one another to be transferred into one of a locking state and an open state, and
wherein the first locking device unit and the further locking device unit are configured to be actuated depending on the machining position of the machining unit.

26. A machine tool for machining workpieces, comprising:
a machining device; and
a workpiece support configured to support a workpiece during machining by the machining device,
wherein the workpiece support comprises:
a workpiece support device having a workpiece side for supporting the workpiece during the machining of the workpiece and a lower side remote from the workpiece side, wherein, from the workpiece side towards the lower side, the workpiece support device is permeable to a waste air flow loaded with machining-related emissions; and
a suction device comprising a vacuum generator and a suction line, wherein the vacuum generator is configured to:
generate the waste air flow directed from the workpiece side towards the lower side of the workpiece support device,
suck off the waste air flow into the suction line in a flow direction, and
subsequently discharge the waste air flow via the suction line,
wherein the suction line has a suction opening on a support device side arranged downstream of the workpiece side of the workpiece support device, and a flow cross section of the suction opening has an opening width,
wherein the suction line is configured such that the waste air flow in the flow direction is capable of passing through the flow cross section of the suction opening of the suction line, and wherein at least one of the opening width of the flow cross section or a position of the suction opening on the suction line is variably adjustable,
wherein the suction opening of the suction line is formed by two through openings each having a flow cross section,
wherein a first through opening of the two through openings is provided on a line wall of the suction line and a second through opening of the two through openings is provided on an adjustment element adjacent to the line wall of the suction line in the flow direction of the waste air flow,
wherein the two through openings provided on the line wall of the suction line and on the adjustment element overlap one another transversely to the flow direction of the waste air flow, such that the flow cross section of the suction opening of the suction line is formed as a resulting flow cross section of the suction opening of the suction line from the flow cross sections of the two through openings and such that the waste air flow is capable of passing through the resulting flow cross section of the suction openings of the suction line in the flow direction, and
wherein the opening width of the resulting flow cross section of the suction opening of the suction line is variably adjustable, because the line wall of the suction line and the adjustment element are able to be advanced relative to one another in an advancing direction extending transversely to the flow direction of the waste air flow to thereby cause a variable mutual overlap of the two through openings transversely to the flow direction.

27. The machine tool of claim 26, wherein the machining device has a machining unit configured to be advanced in parallel with the workpiece support device into a machining position, and
    wherein the suction device comprises the suction line as a first suction line and a further suction line.

28. The machine tool of claim 27, wherein, on at least one of the first suction line and the further suction line, at least one of the opening width of the flow cross section of the suction opening or the position of the suction opening is variably adjustable depending on the machining position of the machining unit.

29. The machine tool of claim 27, wherein at least one of the first suction line or the further suction line is provided with a locking device configured to be actuated by a controller to be transferred into one of a locking state and an open state, and
    wherein the at least one of the first suction line or the further suction line is configured to be disconnected from the vacuum generator of the suction device when the locking device is in the locking state and be connected to the vacuum generator of the suction device when the locking device in the open state, wherein the locking device comprises a first locking device unit associated with the first suction line and a further locking device unit associated with the further suction line, wherein the first locking device unit and the further locking device unit are configured to be actuated independently of one another to be transferred into one of a locking state and an open state, and wherein the first locking device unit and the further locking device unit are configured to be actuated depending on the machining position of the machining unit.

* * * * *